United States Patent
Suga

(10) Patent No.: US 7,733,861 B2
(45) Date of Patent: Jun. 8, 2010

(54) RADIO TERMINAL AND AD HOC COMMUNICATION METHOD

(75) Inventor: Junichi Suga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1472 days.

(21) Appl. No.: 11/019,609

(22) Filed: Dec. 23, 2004

(65) Prior Publication Data

US 2006/0062220 A1 Mar. 23, 2006

(30) Foreign Application Priority Data

Sep. 17, 2004 (JP) .............................. 2004-271447

(51) Int. Cl.
*H04L 12/28* (2006.01)
*H04L 12/16* (2006.01)

(52) U.S. Cl. ..................... 370/392; 370/254; 370/260

(58) Field of Classification Search ............... 370/392, 370/465, 254, 255, 256, 260, 270, 39.3, 395.31, 370/400, 411; 455/445
See application file for complete search history.

(56) References Cited

U.S. PATENT DOCUMENTS

| | | | |
|---|---|---|---|
| 5,833,551 A | | 11/1998 | Vincent et al. .............. 473/350 |
| 6,026,303 A | * | 2/2000 | Minamisawa ............... 455/446 |
| 6,069,896 A | * | 5/2000 | Borgstahl et al. ........... 370/401 |
| 6,456,599 B1 | * | 9/2002 | Elliott ........................ 370/254 |
| 6,574,266 B1 | * | 6/2003 | Haartsen ..................... 375/133 |
| 6,842,460 B1 | * | 1/2005 | Olkkonen et al. ........... 370/465 |
| 6,961,575 B2 | * | 11/2005 | Stanforth ..................... 455/445 |
| 2007/0223497 A1 | * | 9/2007 | Elson et al. ................. 370/400 |

FOREIGN PATENT DOCUMENTS

| | | |
|---|---|---|
| EP | 1478156 A2 * | 11/2004 |
| JP | 2001-285345 | 10/2001 |
| JP | 2003-229869 | 8/2003 |
| JP | 2005319047 | 11/2005 |

* cited by examiner

*Primary Examiner*—Ayaz R Sheikh
*Assistant Examiner*—Blanche Wong
(74) *Attorney, Agent, or Firm*—Hanify & King, PC

(57) ABSTRACT

A source terminal reflects user information of a communication destination terminal in setting information for ad hoc communication, and establishes an ad hoc network by notifying management information including the setting information to terminals surrounding its own terminal. The communication destination terminal monitors the user information of its own terminal in a received management information, and judges that the call is for its own terminal when the user information of its own terminal exists, and reflects the setting information including in the management information in the setting information for the ad hoc communication, and executes the ad hoc communication with the source terminal by participating in the ad hoc network. Then, ad hoc communication processes, manually executed conventionally, is executed automatically.

20 Claims, 9 Drawing Sheets

FIG. 3

| NAME | TELEPHONE NUMBER INFORMATION | PUBLIC KEY INFORMATION |
|---|---|---|
| A | 090-aaaa-bbbb | abcdabcd |
| B | 090-bbbb-cccc | bcdebcde |
| C | 090-cccc-dddd | cdefcdef |

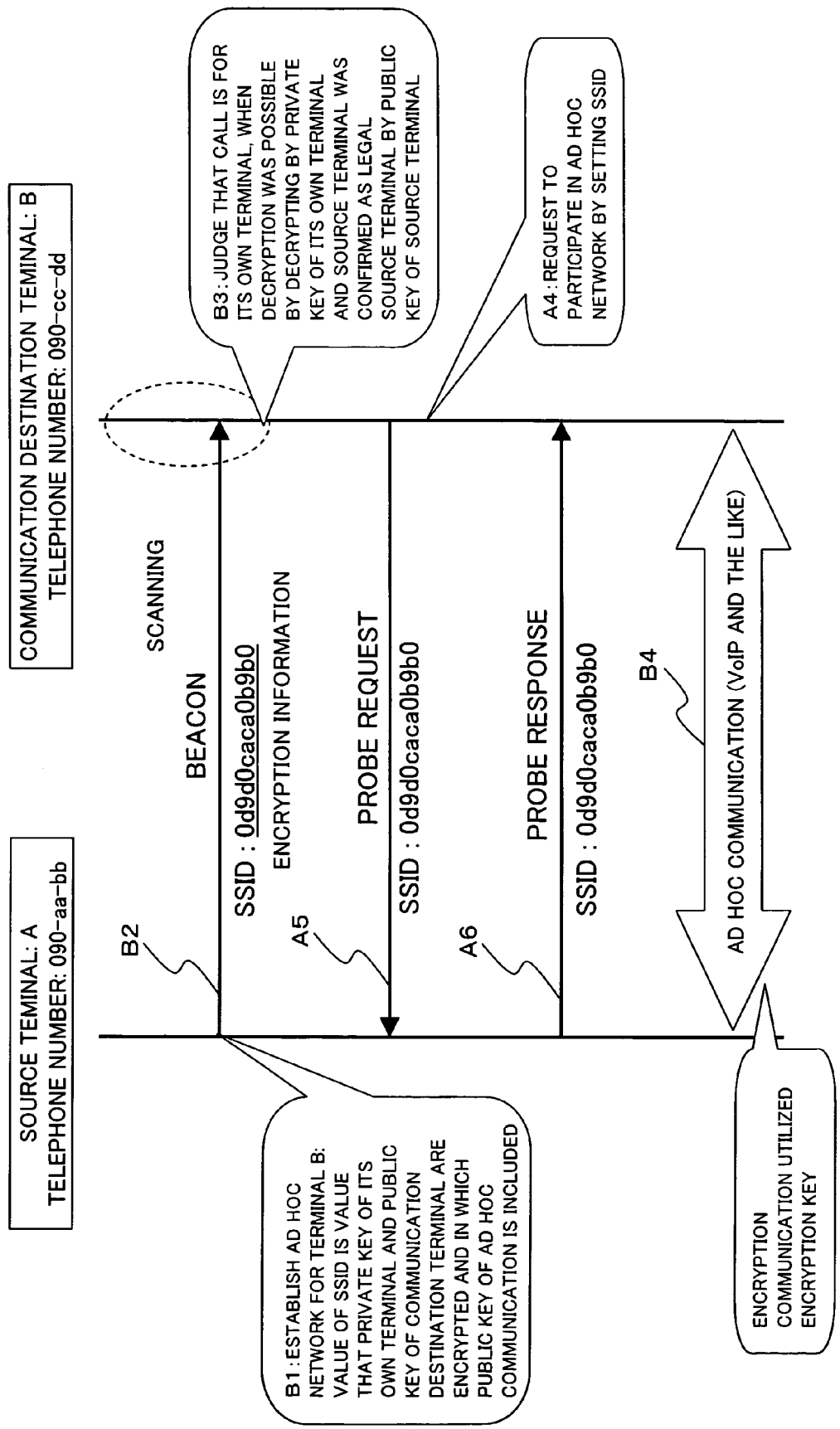

RADIO TERMINAL AND AD HOC COMMUNICATION METHOD

CROSS REFERENCE TO RELATED APPLICATIONS

This application is based on and hereby claims priority to Japanese Application No. 2004-271447 filed on Sep. 17, 2004 in Japan, the contents of which are hereby incorporated by reference.

BACKGROUND OF THE INVENTION (1) Field of the Invention

The present invention relates to a radio terminal and an ad hoc communication method, in particular, in which communication processes are suitably executed automatically when radio terminals having an ad hoc communication function execute ad hoc communication with each other.

(2) Description of the Related Art

By the development of the communication technologies, at present, a communication medium, which is optimal in various communication environments and in using various applications, can be selected by installing a plurality of communication media in single terminal. A wireless LAN (local area network) and cellular dual mode terminal that has been recently released in the market, by installing a wireless LAN communication function in a radio terminal, such as a cellular phone, can switch communication between cellular communication and wireless LAN communication at any time, corresponding to its communication environments. For example, in the office, a call by the VoIP (Voice over Internet Protocol) by utilizing the wireless LAN is executed, and outside the office, a call by utilizing a cellular communication network can be executed.

In this, in the wireless LAN (IEEE (Institute of Electrical and Electronics Engineers) 802.11 Standard), which is installed in the radio terminal, such as the cellular phone, there are two modes of the infrastructure mode and the ad hoc mode. In the case where a user sets the radio terminal to the infrastructure mode, the radio terminal can execute communication via a network by connecting to a nearest access point by wireless. And in the case where the user sets the radio terminal to the ad hoc mode, the radio terminal can directly communicate with a radio terminal that has been set to the ad hoc mode.

Generally, the user sets the radio terminal to the infrastructure mode, and connects the radio terminal to a network in a company or the Internet. However, at the ad hoc mode communication (hereinafter, in some cases, referred to as ad hoc communication), there is a limitation that radio terminals communicating with each other must exist in an area where radio waves can reach both the radio terminals, but there are advantages that the radio terminals can communicate in a state in which an access point does not exist and also communication charges are not necessary because the facilities of the infrastructure are not used. Further, at the ad hoc mode communication, the radio terminals can set a channel for each other, therefore, its communication band can be utilized effectively. Consequently, for example, in the case where a radio terminal that desires to communicate exists in an area where radio waves can reach, it can be supposed that it is effective that the radio terminal executes direct communication by switching the mode to the ad hoc mode.

As technologies relating to the ad hoc communication, there are technologies that have been proposed in the following Patent documents 1 and 2.

In the technology of the Patent document 1, on-demand type communication in which communication terminals move rapidly, two-way communication can be executed for a party being composed of indefinite communication terminals that share topics, and traffic in a network is decreased inside the same group, and the power consumption of the communication terminals is decreased. This is the object of the technology of the Patent document 1. In order to achieve this, when multiple address relay transmission is executed to the indefinite communication terminals, unnecessary communication to communication terminals, which do not have interest or have not existed because of the moving, is prevented.

That is, for each of a plurality of communication terminals that execute group communication, the period of validity, which is longer than going and returning time of communication between the communication terminals being adjacent to each other and is shorter than time supposed to be required for a communication terminal to move out of an area where the communication is available, is set. And the group communication is executed among the communication terminals except the communication terminals whose period of validity has passed.

On the other hand, the technology of the Patent document 2 has an object that a network is formed by asynchronous ad hoc communication. In order to achieve this, a wireless network is formed by the process in which each of radio communication terminals confirms each existence by exchanging management information and also asynchronous communication is executed based on the reception timing described in the management information. With this, without disposing apparatuses becoming control stations such as access points, each of the radio communication terminals can directly communicate with each other in the asynchronous communication. Further, it is not necessary that the information reception be always executed, therefore, the power consumption of each radio communication terminal can be reduced.

[Patent document 1] Japanese Patent Laid-Open (Kokai) 2001-285345

[Patent document 2] Japanese Patent Laid-Open (Kokai) 2003-229869

As conditions that the ad hoc communication is executed between the radio terminals, two conditions are required, that is, as mentioned above, the radio terminals exist in an area where radio waves reach each other (condition 1), and setting information of an ad hoc network is made equal to each other by switching both the radio terminals to the ad hoc mode (condition 2).

In this, the conventional method for executing the ad hoc communication, users of the radio terminals verbally decide the setting information of the ad hoc network beforehand (the condition 1 is satisfied) and the users have executed the setting by inputting the decided setting information in the radio terminals manually (the condition 2 is satisfied). However, executing the setting manually by the users is a very bothersome task for the users. And in this case, since the users decide the setting information verbally, an application for the voice call such as the VoIP is not necessary, and the ad hoc communication has been used only in a limited use such as a file transfer.

And also, in the technologies of the above-mentioned Patent documents 1 and 2, the matching of the setting information for the ad hoc communication of each terminal has been already secured, and each terminal is in a state in which each terminal has already participated or can participate in the ad hoc network. More actually, it is a premise that each terminal is in a state in which the matching of the parameter (the setting information for the ad hoc communication) called as the SSID (Service Set ID) in the management message (beacon message) stipulated in the IEEE 802.11 standard has been secured. Therefore, even in these technologies, it is necessary for each user to input the setting information such as the SSID decided beforehand in the terminal in advance. In this, in the infrastructure mode, the SSID is identification information given to a terminal and an access point being components of the wireless network, and communication cannot be executed when the same SSID is not set in the access point and the terminal.

SUMMARY OF THE INVENTION

It is therefore an object of the present invention to provide a radio terminal and an ad hoc communication method, in which ad hoc communication processes that are manually executed conventionally are executed automatically and time and labor being consumed by a user is saved and the use of the ad hoc communication can be expanded.

For achieving the above-mentioned object, a radio terminal according to the present invention is a radio terminal having an ad hoc communication function. The radio terminal is characterized by comprising a designating means for designating a communication destination terminal, a setting means for reflecting user information of the communication destination terminal designated by the designating means in setting information for ad hoc communication, and an establishing means for establishing an ad hoc network by notifying management information including the setting information to terminals surrounding its own terminal.

In this, the radio terminal can further comprise a confirming means for confirming participation of the communication destination terminal in the established ad hoc network, and an ad hoc communication means for executing ad hoc communication with the communication destination terminal, when the participation of the communication destination terminal in the ad hoc network was confirmed by the confirming means.

And also, the radio terminal comprises network media being two kinds or more including the ad hoc communication, and can comprise a transmitting means for executing a transmitting process to the communication destination terminal by using a different network medium except the ad hoc communication, in the case where the participation of the communication destination terminal in the ad hoc network was not able to be confirmed by the confirming means.

Further, a radio terminal according to the present invention is a radio terminal having an ad hoc communication function. The radio terminal is characterized comprising a monitoring means for monitoring the existence of an ad hoc network by monitoring whether management information exists or not in an area surrounding the radio terminal, a receiving call judging means for judging whether user information of its own terminal is included or not in the management information from the ad hoc network detected by monitoring at the monitoring means, and for judging that a received call is for its own terminal in the case where the user information of its own terminal was included, and a participating means for executing ad hoc communication by reflecting the management information in setting information for ad hoc communication of its own terminal and by participating in the ad hoc network, in the case where the receiving call was judged for its own terminal by the received call judging means.

And an ad hoc communication method according to the present invention is an ad hoc communication method between radio terminals. And at a radio terminal as a source terminal, the ad hoc communication method comprises the steps of reflecting user information of a radio terminal as a communication destination terminal in setting information for ad hoc communication, and establishing an ad hoc network by notifying management information including the setting information to terminals surrounding its own terminal. And at the communication destination terminal, the ad hoc communication method comprises the steps of monitoring the existence of an ad hoc network by monitoring whether management information from surroundings exists or not, judging whether user information of its own terminal is included or not in received management information, and judging that a received call is for its own terminal in the case where the user information of its own terminal was included, reflecting the setting information included in the management information in setting information for the ad hoc communication of its own terminal, and executing ad hoc communication with the source terminal by participating in the ad hoc network.

According to the present invention, a source terminal establishes an ad hoc network in which user information of a communication destination terminal was reflected in setting information. And the communication destination terminal monitors whether an ad hoc network in which its own user information was reflected in the setting information exists or not, with this, the radio terminals can judge whether an ad hoc communication can be executed between the radio terminals or not. And in order that the communication destination terminal participates in the ad hoc network established by the source terminal, the communication destination terminal reflects the management information from the source terminal in the setting information for the ad hoc communication of its own terminal, with this, the communication destination terminal can execute the ad hoc communication with the source terminal. Therefore, ad hoc communication processes, including a setting process that was conventionally executed manually, can be automated.

And also, in the case where the ad hoc communication is impossible, the communication is automatically switched to communication utilized a different network medium, therefore, the user can select suitable communication automatically without any instruction from the user.

BRIEF DESCRIPTION OF THE DRAWINGS

FIG. 3 is a drawing showing an example of user information used in the present embodiment;

FIG. 9 is a diagram showing an example of the ad hoc communication sequence between radio terminals in the modified example of the present embodiment.

DESCRIPTION OF THE PREFERRED EMBODIMENTS

[A] Explanation of Embodiment

Figure 1:
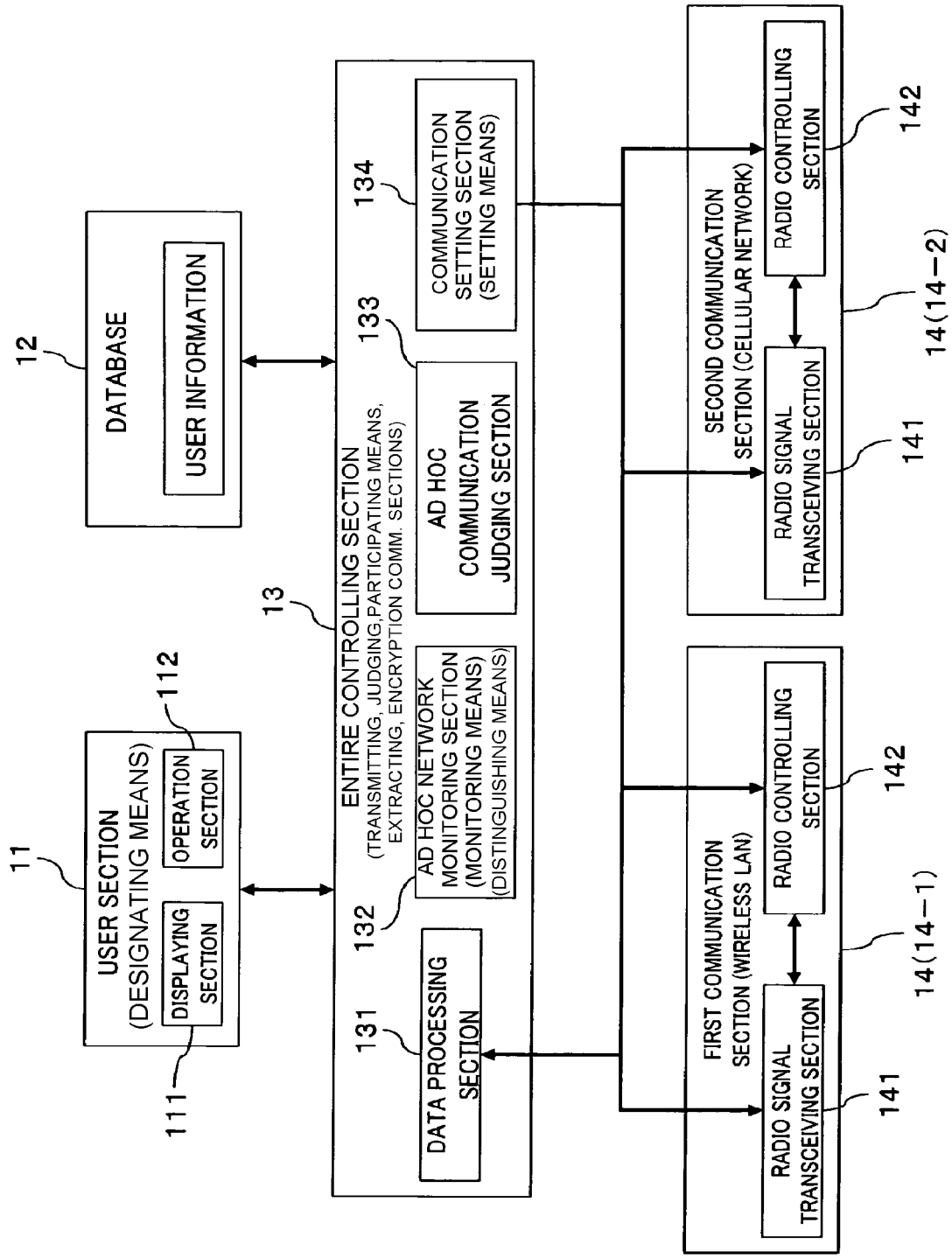
FIG. 1 is a block diagram showing a structure of main parts of a radio terminal according to an embodiment of the present invention.

FIG. 1 is a block diagram showing a structure of main parts of a radio terminal according to an embodiment of the present invention. A radio terminal shown in FIG. 1 comprises a user section 11, a database 12, an entire controlling section 13, and a communication section 14. In this, a plurality of the communication sections 14 can be disposed corresponding to communication media, and in this embodiment, for example, two kinds of the communication sections 14 are provided, that is, a first communication section 14-1 for wireless LAN communication and a second communication section 14-2 for cellular communication or PHS communication. And at least one of the communication sections 14 (the first communication section 14-1) has a communication function in the ad hoc mode (ad hoc communication function). In this, in the ad hoc communication function, for example, a function, such as a transmitting function of an INVITE message by starting up the application of VoIP is included.

The user section 11 works as an interface between a user and the radio terminal, and comprises an operation section 112, which includes necessary function keys and a ten key and the like and on which the user designates user information (user identifying information of a radio terminal, such as a telephone number and an e-mail address) of a communication destination terminal at the time of transmission and also comprises a displaying section 111 on which user information of a source terminal at the time of reception. That is, the user section 11 functions as a designating means for designating the communication destination terminal. In this, "the designation of the communication destination terminal" includes inputting operation of a destination telephone number and searching operation of a destination telephone number in the telephone directory.

The database 12 is realized by using a memory such as a RAM, in which the user information of the communication destination terminals has been stored as information, which has an image of a so-called telephone directory, and the user of the radio terminal can anytime obtain the user information of the communication destination terminals from the database 12 by operating the operation section 112. In FIG. 3, an example of the user information being stored in the database 12 is shown. In FIG. 3, for each of the users of the terminals that can become the communication destination terminals, the public key information as well as the telephone number information is stored in a state of combination as the user information. The public key information is used for increasing the security of the ad hoc network, and this is explained later in detail in a modified example of the embodiment.

The entire controlling section 13 controls the overall radio terminal, and comprises functions that reflect user information of a communication destination terminal designated by a user in the setting of radio communication and judge whether ad hoc communication is possible or not and execute switching to a different network medium as call transmitting functions, and also comprises functions that monitor a surrounding ad hoc network and judge whether a received call exists or not from a management message as call receiving functions. In this, the entire controlling section 13 is realized by, for example, a CPU.

Therefore, when the functions of main parts of the entire controlling section 13 are observed, the entire controlling section 13 comprises, for example, a data processing section 131, an ad hoc network monitoring section 132, an ad hoc communication judging section 133, and a communication setting section 134.

In this, the data processing section 131 executes necessary processes for transmitting/received data at the time of communication by each of the communication sections 14-1 and 14-2. The ad hoc network monitoring section (monitoring means) 132 monitors whether an ad hoc network for its own radio terminal exists or not in the surrounding area of its own radio terminal (area within reach of radio waves of its own radio terminal). Actually, the ad hoc network monitoring section 132 monitors whether a management message (beacon message) (for example, in which user information, such as the telephone number of its own radio terminal, is included) (refer to FIG. 2) for its own radio terminal transmitted from another radio terminal (source terminal), which works as an access point, as will be mentioned later, is received or not, with this, the ad hoc network monitoring section 132 can detect whether an ad hoc network for its own radio terminal exists or not.

Figure 2:
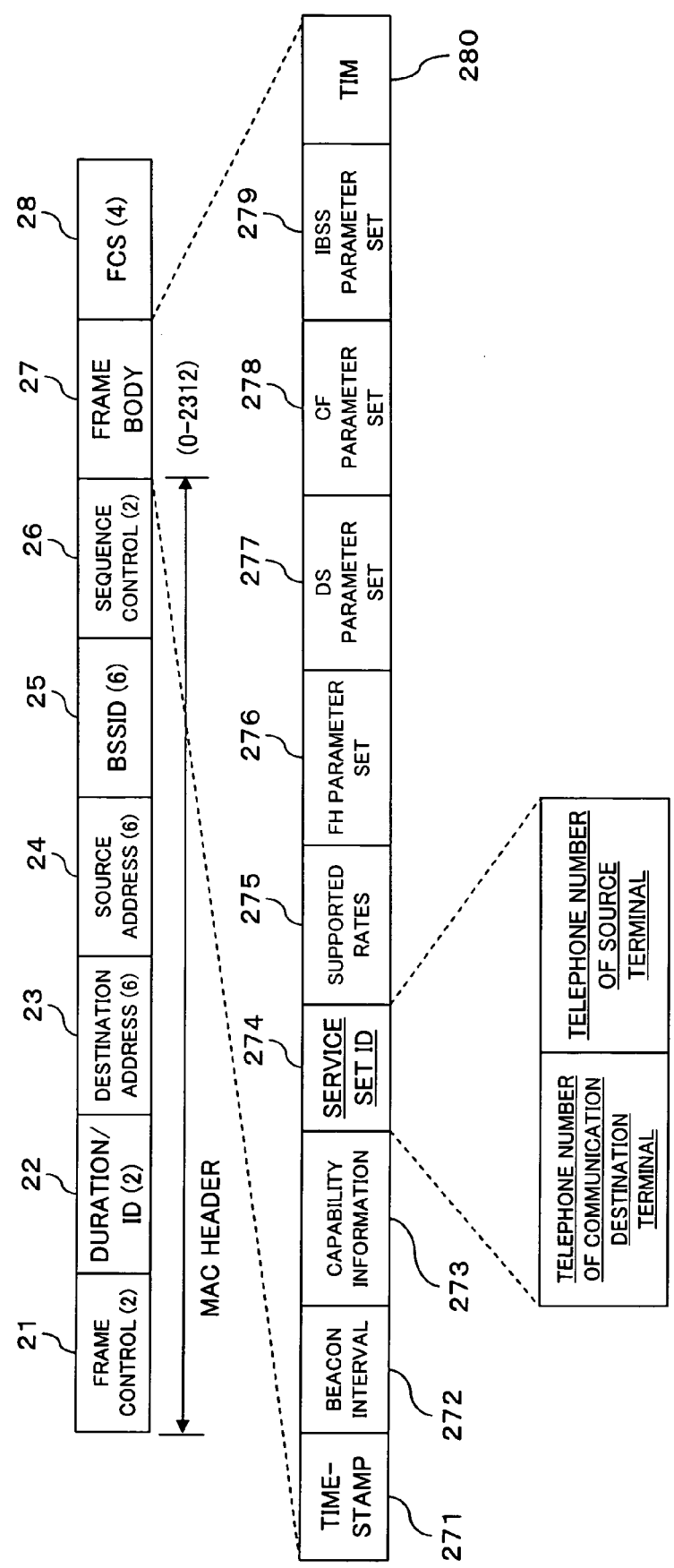
FIG. 2 is a diagram showing a frame structure of a management message of the IEEE 802.11 standard used in the present embodiment.

FIG. 2 is a diagram showing a frame structure of the management message of the IEEE 802.11 standard. As shown in FIG. 2, the management message comprises the MAC (Media Access Control) frame that is shown below as the basic format. The MAC frame has a frame control field 21 (2 octets), a duration/ID field 22 (2 octets), a destination address field 23 (6 octets), a source address field 24 (6 octets), a BSSID field 25 (6 octets), a sequence control field 26 (2 octets), a frame body 27 (0 to 2312 octets), and a FCS (Frame Check Sequence) field 28 (4 octets). And in the frame control field 21, version information of the MAC protocol and information displaying the type of its own message (management, control, or data) can be designated. For example, the following displays are stipulated. That is, in the case of a beacon message (management information) for notifying the existence of a radio cell, as the type information, "1000" is designated and the information is displayed, in the case of a probe request that a radio terminal inquires whether a radio cell exists or not in an area surrounding the radio terminal, "0100" is designated and the information is displayed, and in the case of a probe response for the probe request, "0101" is designated and the information is displayed.

And in the case of a beacon message, as shown in FIG. 2, in the frame body 27, further, as information elements, time stamp information 271, beacon interval information 272, capability information 273, SSID information 274, supported rates information 275, an FH parameter set 276, a DS parameter set 277, a CF parameter set 278, an IBSS parameter set 279, a TIM (traffic indication map) 280, and the like are stored.

In the wireless LAN, in order to identify a network (that is, an access point), the SSID is used, however, the source terminal can establish an ad hoc network for a communication destination terminal by setting at least the user information of the communication destination terminal (for example, telephone number information) in the value of this SSID (setting information for ad hoc communication) so that the source terminal itself functions as an access point. In this, in the value of the SSID, the user information of the source terminal (for example, telephone number information) can also be set.

Therefore, the communication destination terminal can judge that it is the ad hoc network for its own terminal when the user information (telephone number information) of its own terminal was included in the value of the SSID in the received management message (beacon message). And as will be mentioned later, for expressing its intentions to participate in the ad hoc network and confirming the participation, the above-mentioned probe request message and probe response message are used. It is possible to define and use other original messages similar to these above-mentioned messages, however, it is desirable that these existing messages be used from a viewpoint of generality.

In this, the details of the above-mentioned various fields and information elements are stipulated in the IEEE 802.11, therefore, its further explanation is omitted.

The ad hoc communication judging section 133 judges whether the ad hoc communication can be executed or not. In the case where its own terminal is the source terminal, the ad hoc communication judging section 133 judges whether the communication destination terminal (call receiving terminal) participates in the ad hoc network within a predetermined time or not and also judges whether the ad hoc communication can be executed with the communication destination terminal or not. In the case where its own terminal is the communication destination terminal, the ad hoc communication judging section 133 judges whether the ad hoc communication with the source terminal can be approved or not.

The communication setting section (setting means) 134 sets various setting information, which is required in the wireless LAN communication (including the ad hoc communication) by the first communication section 14-1 or in the cellular communication by the second communication section 14-2, in the communication section 14-1 or 14-2 respectively. In the embodiment of the present invention, the communication setting section 134 functions as a setting means, which reflects the user information (telephone number information) of the communication destination terminal designated by the user section 11 being a designating means in the setting information (SSID) for the ad hoc communication.

Each of the first and second communication sections 14-1 and 14-2 comprises a radio signal transceiving section 141 and a radio controlling section 142. And the radio controlling section 142 controls the radio signal transceiving section 141 based on the information set from the communication setting section 134 in the entire controlling section 13, with this, the radio terminal can execute the wireless LAN communication or the cellular communication with other terminal.

Next, an ad hoc communication method by the radio terminal in the embodiment of the present invention having the above-mentioned structure is explained in detail.

In order to make processes of the ad hoc communication automatic, in the case where a radio terminal executes communication with a specific destination radio terminal, it is necessary that its own radio terminal and the destination radio terminal exist in an area where radio waves reach each other. Further, it is necessary to judge whether the ad hoc communication can be executed or not, and to match the setting information of the ad hoc network between its own radio terminal and the destination radio terminal when both radio terminals exist in the area where the radio waves reach each other.

Figure 4:
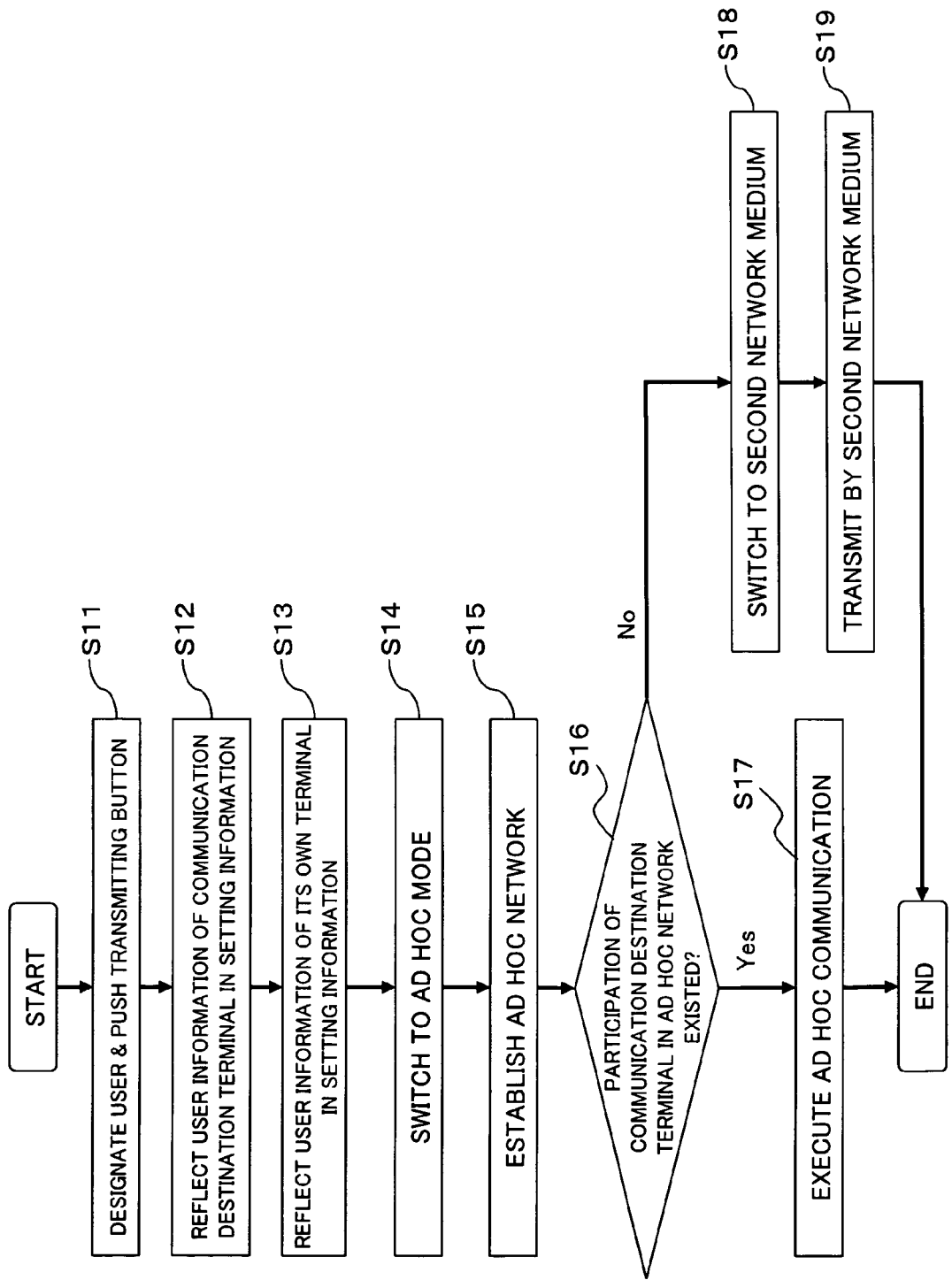
FIG. 4 is a flowchart for explaining operation of a radio terminal (source terminal) in the present embodiment.

Therefore, the radio terminal in the embodiment of the present invention, in the case where the radio terminal is at the source side (that is, in the case where the radio terminal functions as a source terminal), operates corresponding to a flowchart shown in FIG. 4 (steps S11 to S19). And in the case where the radio terminal is at the destination side (that is, in the case where the radio terminal functions as a communication destination terminal), operates corresponding to a flowchart shown in FIG. 5 (steps S21 to S30).

(1) Operation of Source Side (Source Terminal)

First, the user of a radio terminal makes user information of a destination radio terminal with which the user desires to communicate display on the displaying section 111, reading the user information from the database 12, by operating the operation section 112 in the user section 11, and designates the destination radio terminal specified by the user information as its destination and pushes a transmitting button (not shown) (step S11). By the above-mentioned operation, the communication setting section 134 sets the user information (for example, telephone number information) of the communication destination terminal and the user information (for example, telephone number information) of its own terminal in each radio controlling section 142 of the first communication section 14-1 and the second communication section 14-2 respectively as setting information and reflects the user information in the setting information (steps S12 and S13).

After this, the entire controlling section 13 (the communication setting section 134) switches the communication mode of its own terminal to the ad hoc mode (step S14), and establishes an ad hoc network for the communication destination terminal (step S15) That is, the first communication section 14-1, at the radio controlling section 142, generates a management message (beacon message), in which the setting information (the user information of the communication destination terminal and its own terminal) set from the entire controlling section 13 (the communication setting section 134) was set in the SSID shown in FIG. 2, and transmits (notifies) the management message to an area surrounding its own terminal from the radio signal transceiving section 141 periodically, with this, establishes an ad hoc network for the communication destination terminal. That is, the first communication section 14-1 works as a function being an establishing means that establishes the ad hoc network by notifying the management message being the management information including the above-mentioned setting information to the area surrounding its own terminal.

After this, the entire controlling section 13 of the source terminal, by the ad hoc communication judging section 133, monitors whether the communication destination terminal participates in the ad hoc network or not for a predetermined time. That is, the ad hoc communication judging section 133 monitors whether the probe request message, in which the user information of the communication destination terminal and the user information of its own terminal have been designated in the SSID, is received or not for a predetermined time (step S16). In this monitoring state, when the expression of the intentions for participating in the ad hoc network of the communication destination terminal was confirmed by receiving the probe request message (Yes, in the step S16), the entire controlling section 13 executes an ad hoc communication by such as VoIP with the communication destination terminal (step S17). That is, the data processing section 131 executes necessary data processing for user data transmitting/received via the first communication section 14-1.

That is, the ad hoc communication judging section 133 works as a function being a confirming means that confirms the participation of the communication destination terminal in the established ad hoc network. And the data processing section 131 and the first communication section 14-1 work as a function being an ad hoc communication means that executes the ad hoc communication with the communication destination terminal, when the participation of the communication destination terminal in the ad hoc network was confirmed by the ad hoc communication judging section 133.

In the case where the communication destination terminal has not participated in the ad hoc network even when the predetermined time has passed, by a reason such as that the communication destination terminal does not exist in an area (radio cell) where radio waves of its own terminal reach, that is, in the case where the probe request message cannot be received at the source terminal, the entire controlling section 13 switches the communication mode from the ad hoc mode to a communication mode by a different (second) network medium (for example, cellular medium or PHS medium) (No, in the step S16, and to step S18), and the transmission by the second communication section 14-2 is executed (step S19).

That is, the entire controlling section 133, in the case where the participation of the communication destination terminal in the ad hoc network cannot be confirmed at the ad hoc communication judging section 133, also works as a function being a transmitting means that executes a transmitting process to the communication destination terminal by using a different network medium except the ad hoc communication. In this, this transmitting process is executed based on the setting information set (reflected) from the communication setting section 134.

As mentioned above, in the case where the ad hoc communication is impossible, the communication is automatically switched to communication utilizing a different network medium, therefore, the user can select suitable communication automatically without any instruction from the user.

(2) Operation of Destination Side (Communication Destination Terminal)

Figure 5:
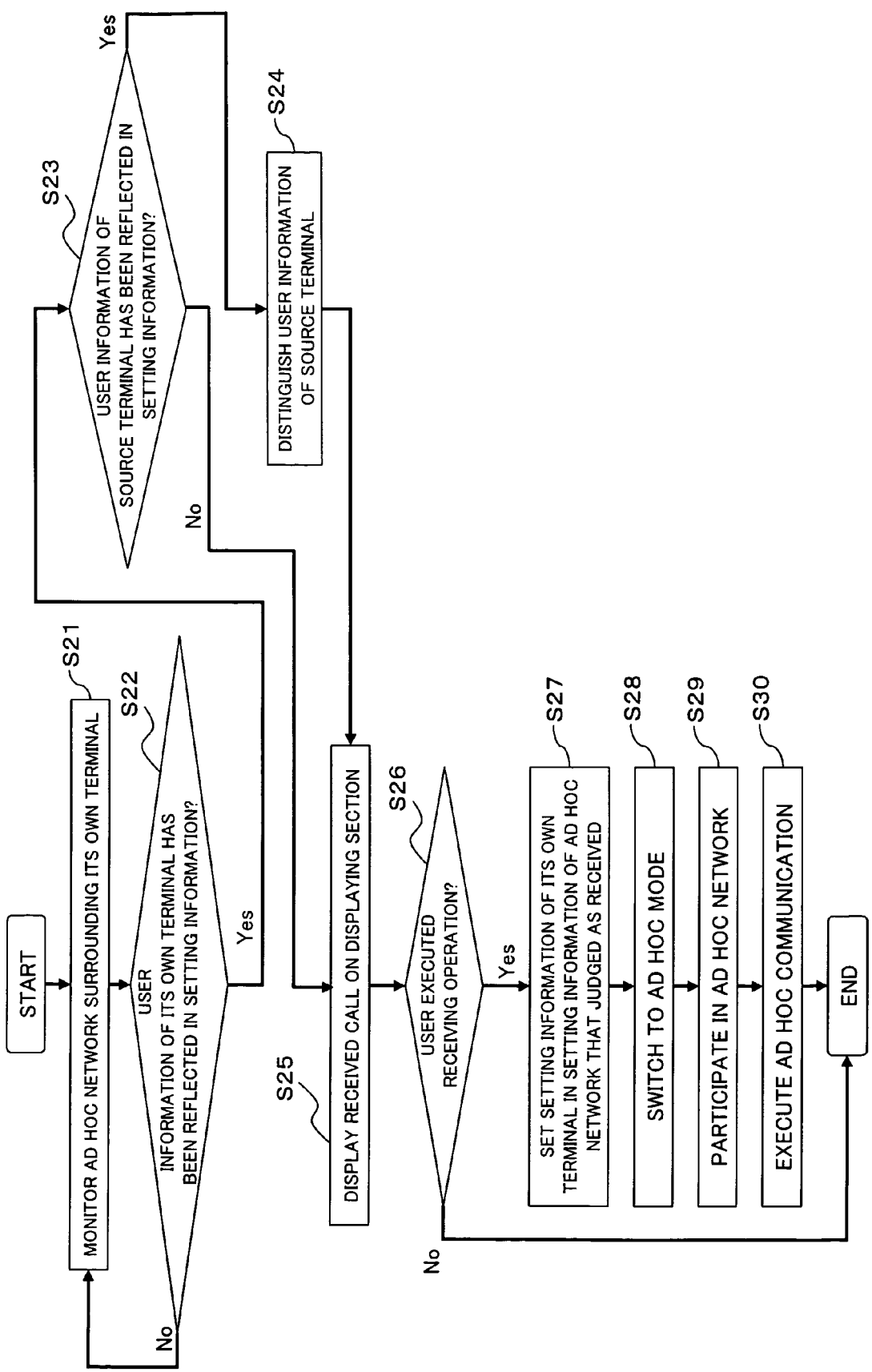
FIG. 5 is a flowchart for explaining operation of a radio terminal (communication destination terminal) in the present embodiment.

On the other hand, in the case where the radio terminal is at the destination side (in a standby state), as shown in FIG. 5, the entire controlling section 13, by the ad hoc network monitoring section 132, monitors whether the management message (beacon message) was received or not, and in the case where the management message was received, monitors whether the user information (telephone number information) of its own terminal has been set (reflected) in the setting information (SSID) of the received management message. With this, the ad hoc network monitoring section 132 monitors whether an ad hoc network for its own terminal exists or not in an area surrounding its own terminal (step S21, and No, in step S22).

When the user information of its own terminal has been set in the received management message (Yes, in the step S22), the ad hoc network monitoring section 132 further confirms whether the user information (telephone number information) of the source terminal has been set (reflected) in the received management message or not (step S23). In the case where the user information has been set in the received management message, the ad hoc network monitoring section 132 distinguishes (identifies) the user information of the source terminal by collating the user information with the user information in the database 12 (Yes, in the step S23, and to step S24).

That is, the ad hoc network monitoring section 132, in the case where it was judged that the received call was for its own terminal, judges whether the user information of the source terminal that established the ad hoc network is included in the management information or not, and when the user information of the source terminal was included in the management information, the ad hoc network monitoring section 132 distinguishes the source terminal based on the user information. That is, the ad hoc network monitoring section 132 also functions as a source terminal distinguishing means.

And the entire controlling section 13 makes the displaying section 111 display the received call with the distinguished user information by controlling the displaying section 111 (step S25). In this, in the case where the user information of the source terminal has not been set in the received management message (No, in the step S23), or in the case where the user information has not been registered in the database 12, the received call is displayed without displaying the user information of the source terminal.

That is, the entire controlling section 13 works as a function being a call reception judging means that judges whether the user information of its own terminal is included in the management message from the detected ad hoc network by monitoring at the ad hoc network monitoring section 132 and judges that the received call is for its own terminal when the user information of its own terminal was included.

After this, the entire controlling section 13 (the ad hoc network monitoring section 132) monitors whether the user executes receiving operation responding to the received call or not by operating the operation section 112 for the received call (step S26). When the receiving operation was detected, the communication setting section 134 sets the setting information of its own terminal in the SSID of the received management message (beacon message) (sets in the radio controlling section 142 in the first communication section 14-1) (Yes, in the step S26, and to step S27).

And the entire controlling section 13 switches the communication mode of its own terminal to the ad hoc communication mode (step S28), and participates in the ad hoc network for its own terminal (step S29), and starts the ad hoc communication with the source terminal by the first communication section 14-1 (step S30). That is, the entire controlling section 13 and the first communication section 14-1, as mentioned above, in the case where it was judged that the received call was for its own terminal, reflects the setting information (SSID) included in the received management message in the setting information for the ad hoc communication of its own terminal, and participates in the ad hoc network and executes the ad hoc communication. That is, the entire controlling section 13 and the first communication section 14-1 work as a function being a participating means that executes the ad hoc communication by participating in the ad hoc network.

In the present embodiment, the participation in the ad hoc network is executed as follows: the above-mentioned setting information (the user information of its own terminal and the user information of the source terminal) is set in the SSID of the probe request message for the source terminal, and the probe request message is transmitted to the source terminal, and the probe response message is received from the source terminal.

Figure 6:
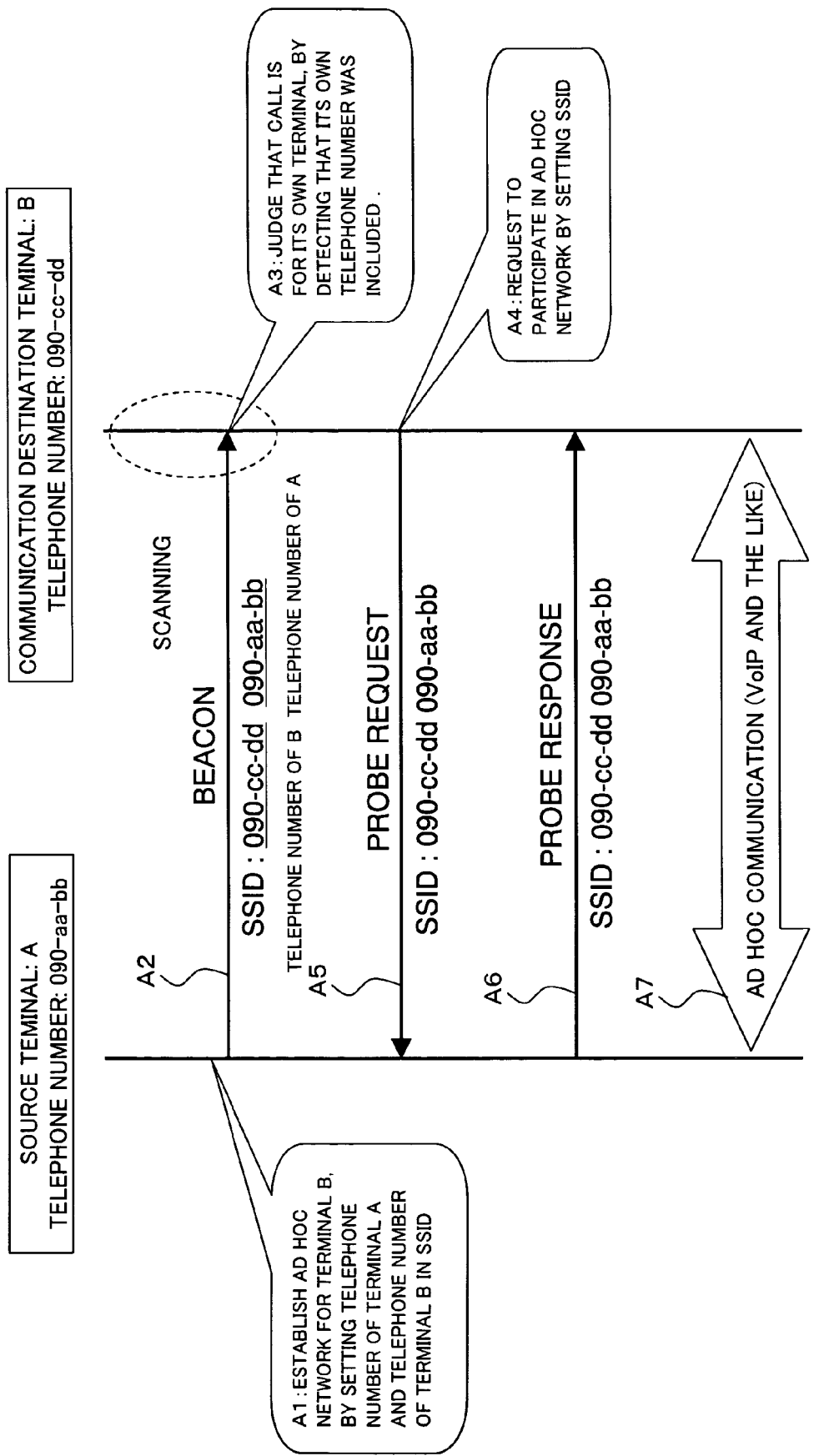
FIG. 6 is a diagram showing an example of an ad hoc communication sequence between radio terminals in the present embodiment.
Figure 7:
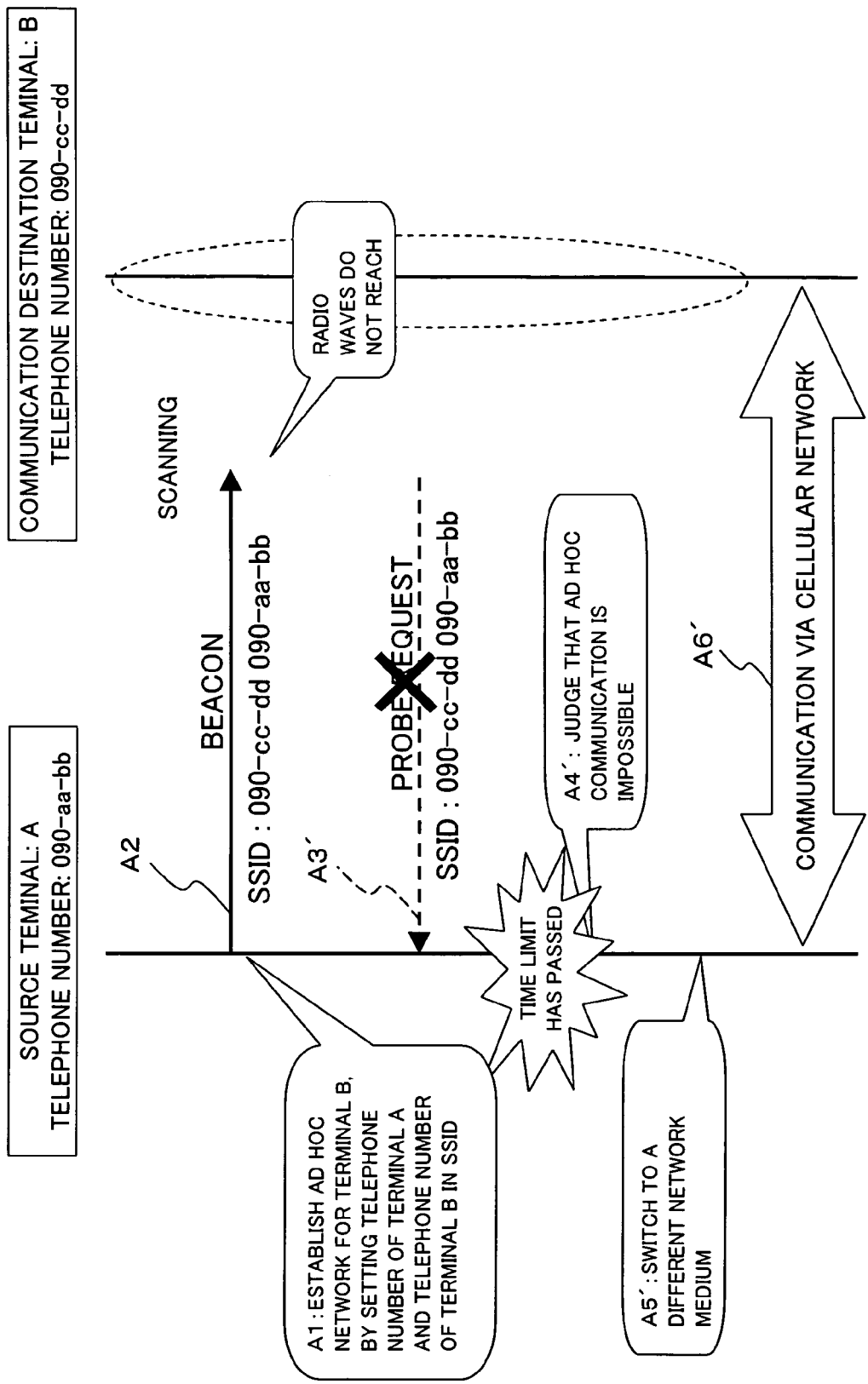
FIG. 7 is a diagram showing another example of the ad hoc communication sequence between the radio terminals in the present embodiment.

Next, referring to FIGS. 6 and 7, an actual example is explained in detail. In the following explanation, the sign A is attached to the radio terminal of the transmitting side (source terminal), and the sign B is attached to the radio terminal of the receiving side (communication destination terminal), and the user information (telephone number information) of the source terminal A is set to be 090-aa-bb, and the user information (telephone number information) of the communication destination terminal B is set to be 090-cc-dd.

As shown in FIG. 6, the source terminal A establishes the ad hoc network for the communication destination terminal B, by the processes of the steps S11 to S15 shown in FIG. 4. That is, the source terminal A sets the telephone number "090-cc-dd" of the communication destination terminal and the telephone number "090-aa-bb" of its own terminal in the SSID of the management message (beacon message) and transmits the management message to the communication destination terminal B periodically (steps A1 and A2).

In the case where the communication destination terminal B exists in the radio cell of the source terminal A, the communication destination terminal B receives the beacon message. Since the telephone number "090-cc-dd" of its own terminal has been included in the beacon message, it is judged that the call is for its own terminal B, and the communication destination terminal B makes the displaying section 111 display the received call, by the processes of the steps S21 to S25 shown in FIG. 5 (step A3). For this display of the received call, when the communication destination terminal B requested to participate in the ad hoc network and executed the receiving operation via the operation section 112, corresponding to the steps S27 to S29 from the Yes route of the step S26, as the setting information of its own terminal B for executing the ad hoc communication, the communication destination terminal B reflects the setting information included in the management message (beacon message), and also transmits the probe request message, in which the setting information (the telephone number of the terminal A and the telephone number of the terminal B) is included as the SSID, to the source terminal A (steps A4 and A5).

When the source terminal A receives the probe request message, the source terminal A generates the probe response message including the above-mentioned setting information as its response and transmits the probe response message to the communication destination terminal B (step A6). When the communication destination terminal B receives the probe response message, the ad hoc communication by the VoIP and the like is started between the source terminal A and the communication destination terminal B (step A7, the step S17 in FIG. 4, and the step S30 in FIG. 5).

On the other hand, as shown in FIG. 7, after the establishment of the ad hoc network, in the case where any response was not transmitted from the communication destination terminal B even when a predetermined time has passed, that is, in the case where the source terminal A cannot receive the probe request message (step A3'), the source terminal A, corresponding to the processes of the steps S18 and S19 from the No route of the step S16 shown in FIG. 4, judges that the communication destination terminal B exists in an area where radio waves from the source terminal A do not reach, and judges that the ad hoc communication is impossible (step A4'). And the source terminal A switches the communication medium to the second network medium (cellular communication) (step A5'), and executes the communication with the communication destination terminal B via the cellular network (step A6').

As mentioned above, according to the present embodiment, the source terminal establishes the ad hoc network in which the user information of the communication destination terminal was reflected in the setting information (SSID), and the communication destination terminal monitors whether an ad hoc network, in which the user information of its own terminal has been reflected in the setting information, exists or not. With this, the judgment, whether the ad hoc communication is possible or not, can be executed between the radio terminals.

And in order that the communication destination terminal participates in the ad hoc network established by the source terminal, the communication destination terminal can execute the ad hoc communication with the source terminal, by reflecting the management message of the ad hoc network in the setting information of its own terminal.

That is, when a user who has a radio terminal executes transmitting operation to a specific communication destination terminal, the user establishes an ad hoc network in which the user information of the communication destination terminal was reflected in the setting information (SSID). With this, first, the user attempts the communication in the ad hoc mode, and in the case where the communication destination terminal participates in the established ad hoc network, the user starts the ad hoc communication, therefore, the reduction of the communication charges for the user of each radio terminal can be realized largely.

Further, in the case where the source terminal judged that the ad hoc communication was impossible, the communication is switched to communication by a different network medium, such as cellular communication and PHS communication, therefore, the user can select suitable communication automatically without any instruction of the user.

[B] Explanation of Modified Example of Embodiment

Figure 8:
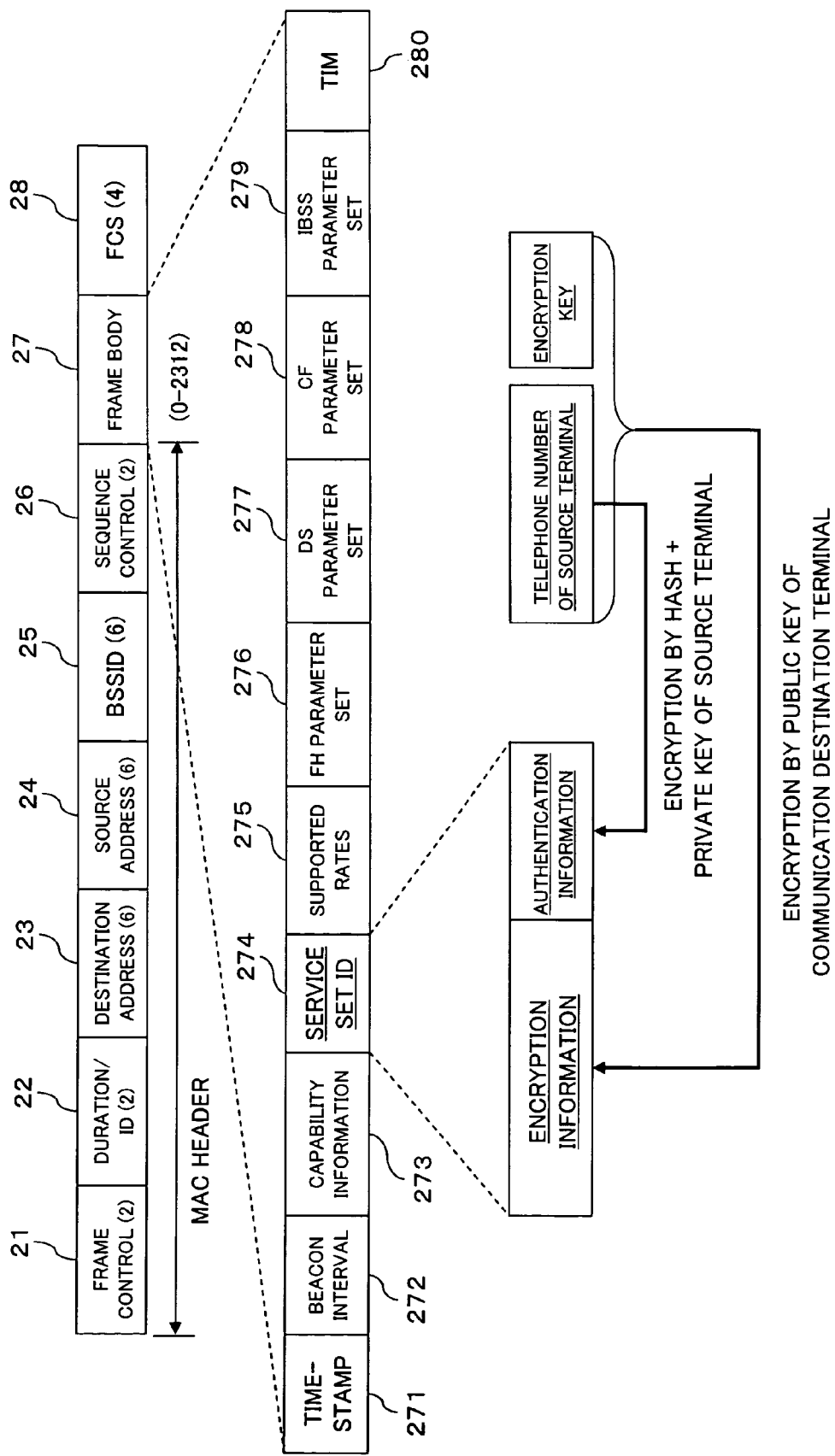
FIG. 8 is a diagram showing a frame structure of a management message of the IEEE 802.11 standard used in a modified example of the present embodiment.

In the above-mentioned embodiment, as the SSID that is included in the management message (beacon message), the user information (telephone number information) of the source terminal and the communication destination terminal is set as it is. However, in this setting, if a third party wiretaps the management message and analyzes its contents, the radio terminals that execute the ad hoc communication (the users who execute the ad hoc communication with each other) can be specified, and there is a problem in security. Therefore, in the modified example of the embodiment, for example, as shown in FIG. 8, in the SSID (Service Set ID) 274 of the management message (beacon message), a value, which is a combination of authentication information obtained by hashing the telephone number of the source terminal and encrypting by its own private key and encryption information obtained by encrypting the telephone number of the source terminal and the encryption key used for the ad hoc communication by the public key of the communication destination terminal, is set. In this, this setting is executed, for example, by the communication setting section 134 shown in FIG. 1. And the public key of the communication destination terminal, for example, as shown in FIG. 3, is registered and managed for individual users in the database 12 as the user information.

That is, the communication setting section 134 in this case functions as a means that reflects information, which was encrypted by using (either one or) both of the private key being the user information of its own terminal and the public key being the user information of the communication destination terminal, in the setting information for the ad hoc communication, and also functions as a means that sets information, which is obtained by encrypting the encryption key used for the ad hoc communication by using the public key being the user information of the communication destination terminal, in the setting information.

With this, the communication destination terminal decrypts the receiving management message (beacon message) by its own private key, and when the decryption is possible, can obtain the telephone number and the encryption key of the source terminal. That is, the source terminal, by using the private key of its own terminal and the public key of the communication destination terminal, executes the authentication (legality of the source terminal) and the concealment of communication (concealing who execute communication with each other) and distributes the encryption key for the ad hoc communication.

And the communication destination terminal, at the entire controlling section 13, by using it own private key and the public key of the source terminal, executes the judgment of the received call (judges that it is the received call when the management information can be decrypted by its own private key) and the authentication of the source terminal (confirms that the source terminal is legal). That is, the entire controlling section 13 (received call judging means and source terminal distinguishing means) of the communication destination terminal includes a function as a means that judges whether the management message (SSID) can be decrypted or not by using the private key being the user information of its own terminal and judges that the received call is for its own terminal when the management message was able to be decrypted, and a function as a means that judges whether the management message (SSID) can be decrypted or not by using the public key being the user information of the source terminal and judges that the management message is a message from a legal source terminal when the management message was able to be decrypted.

Referring to FIG. 9, an actual example is explained. First, the source terminal A, for example, in the step S15 shown in FIG. 4, establishes the ad hoc network by transmitting the management message, in which the combination of the authentication information and the encryption message is set as the value of the SSID, to the communication destination terminal B periodically (steps B1 and B2).

When the communication destination terminal B receives the management message, the communication destination terminal B decrypts the value of the SSID by using its own private key, and judges that the call is for its own terminal when the value of the SSID is able to be decrypted, and makes the displaying section 111 display the received call, similar to the processes in the step S24 and S25 shown in FIG. 5. And also in the case where the value of the SSID is able to be decrypted, since the user information (telephone number information) of the source terminal A can be obtained, the communication destination terminal B, by using the user information (public key) of the source terminal A, confirms the matching with the authentication information, and confirms (authenticates) whether the source terminal A is a legal source terminal or not (step B3).

As a result, in the case where the source terminal A was confirmed as the legal source terminal, the communication destination terminal B, similar to the case shown in FIG. 6, participates in the ad hoc network by transmitting the probe request message to the source terminal A and receiving the probe response message from the source terminal A (steps A4, A5, and A6), and the ad hoc communication is executed in encryption by using the encryption key obtained at the time when the decryption was executed (step B4). And at this time, by using the encryption key, the authentication is executed by each other (IEEE 802.11 standard).

That is, the entire controlling section 13 and the first communication section 14-1 (participating means) include a function as an extracting section that decrypts the encryption key for the ad hoc communication from the management message (SSID) by using the private key being the user information of its own terminal and extracts the decrypted encryption key, and a function as an encryption communication section that executes the ad hoc communication in encryption by using the encryption key extracted by the extracting section.

In this, the operation of the source terminal A and the communication destination terminal B except the above-mentioned operation is basically the same as that shown in FIGS. 4 and 5.

As mentioned above, according to the present modified example, when the source terminal establishes the ad hoc network, as the setting information (SSID), by not using the telephone number of the source terminal as it is, the value, which a combination of the authentication information obtained by hashing the telephone number of the source terminal and encrypting by its own private key, and the encryption information obtained by encrypting the telephone number of the source terminal and the encryption key used for the ad hoc communication by the public key of the communication destination terminal, is set. And the communication destination terminal executes the judgment of the received call and the authentication of the source terminal by using its own private key and the public key of the source terminal. Therefore, the security of the ad hoc communication is improved largely and the safety property of the communication can be secured.

The present invention is not limited to the embodiment and the modified example of the embodiment. It is needless to say that the art of the present invention can change or modify the embodiments without departing from the scope and spirit of the present invention.

As mentioned above in detail, according to the present invention, a source terminal establishes an ad hoc network in which user information of a communication destination terminal was reflected in setting information. The communication destination terminal monitors whether an ad hoc network in which its own user information was reflected in the setting information exists or not, and can execute ad hoc communication by participating in the ad hoc network. Therefore, ad hoc communication processes, including a setting process that was conventionally executed manually, can be automated, and the present invention has excellent advantage in the radio communication technology field.

What is claimed is:

1. A radio terminal having an ad hoc communication function, comprising:
   a designating section configured to designate a destination terminal to establish a new ad hoc communication;
   a setting section configured to automatically generating setting information for the new ad hoc communication including user information of said destination terminal designated by said designating section in setting information for the ad hoc communication; and
   a transmitting section configured to broadcast management information including said setting information, wherein if the destination terminal has an ad hoc communication function and identifies said user information of said setting information of said management information as its own user information, the destination terminal is to automatically set said setting information as setting information for the new ad hoc communication to establish the new ad hoc communication between the radio terminal and the destination terminal.

2. The radio terminal according to claim 1, wherein said setting section comprises a section configured to set user information of its own terminal in said setting information, in addition to the user information of said destination terminal.

3. The radio terminal according to claim 1, wherein said user information of said destination terminal is telephone number information.

4. The radio terminal according to claim 1, wherein said transmitting section comprises a section configured to broadcast said management information including said setting information to the new radio area periodically.

5. The radio terminal according to claim 1, further comprising:
   a confirming section configured to confirm participation of said destination terminal in said ad hoc network; and an ad hoc communication section configured to perform ad hoc communication with said destination terminal, when the participation of said destination terminal in said ad hoc network was confirmed by said confirming section.

6. The radio terminal according to claim 5, further comprising:
network media comprising a plurality of kinds of communication media and including the ad hoc communication; and
a transmitting section configured to transmit to said destination terminal by using a different network medium other than the ad hoc communication, in the case where the participation of said destination terminal in said ad hoc network was not able to be confirmed by said confirming section.

7. The radio terminal according to claim 1, wherein, said setting section comprises a section configured to set information that is encrypted by using either one or both of a private key being the user information of its own terminal and a public key being the user information of said destination terminal in said setting information.

8. The radio terminal according to claim 1, wherein, said setting section comprises a section configured to set, in said setting information, information comprising an encryption key to be used in the ad hoc communication that was encrypted by using a public key being the user information of said destination terminal.

9. An ad hoc communication method between radio terminals in an ad hoc network, comprising the steps of:
at a radio terminal having an ad hoc function as a source terminal:
automatically generating setting information for the new ad hoc communication including user information of a radio terminal having an ad hoc function as a destination terminal;
broadcasting management information including said setting information;
at said destination terminal:
monitoring the existence of management information broadcasted from said source terminal in the ad hoc network;
if there exists management information, judging whether the user information of the setting information of the management information is its own user information; and
automatically setting said setting information as setting information for the new ad hoc communication to establish the new ad hoc communication with the source terminal.

10. The ad hoc communication method according to claim 9, at said source terminal, further comprising the step of:
setting user information of its own terminal in its own setting information, in addition to the user information of said destination terminal.

11. The ad hoc communication method according to claim 9, at said source terminal, further comprising the step of:
in order to establish said ad hoc network,
broadcasting said management information including said setting information to the new radio area periodically.

12. The ad hoc communication method according to claim 9, at said source terminal, further comprising the steps of:
confirming participation of said destination terminal in said ad hoc network; and
performing the ad hoc communication with said destination terminal, when the participation of said destination terminal in said ad hoc network was confirmed.

13. The ad hoc communication method according to claim 12, wherein said source terminal provides network media being two kinds or more including the ad hoc communication, and at said source terminal, further comprising the step of:
in the case where the participation of said destination terminal in said ad hoc network was not able to be confirmed,
executing a transmitting process to said destination terminal by using a different network medium except the ad hoc communication.

14. The ad hoc communication method according to claim 9, at said source terminal, further comprising the step of:
using setting information that is encrypted by using either one or both of a private key being the user information of its own terminal and a public key being the user information of said destination terminal in said setting information.

15. The ad hoc communication method according to claim 14, wherein at said destination terminal, further comprising the steps of:
judging whether said management information is able to be decrypted or not by using a private key being the user information of its own terminal, and judging that the received call is for its own terminal when said management information was able to be decrypted.

16. The ad hoc communication method according to claim 14, wherein at said destination terminal, further comprising the steps of:
judging whether said management information is able to be decrypted or not by using a public key being the user information of said source terminal, and judging that said management information is information from a legal source terminal when said management information was able to be decrypted.

17. The ad hoc communication method according to claim 9, wherein at said source terminal, further comprising the step of:
using setting information, in which an encryption key to be used in the ad hoc communication was encrypted by using a public key being the user information of said destination terminal, in said setting information.

18. The ad hoc communication method according to claim 17, wherein at said destination terminal, further comprising the steps of:
decrypting said encryption key for the ad hoc communication from said management information by using said private key being the user information of its own terminal and extracting said decrypted encryption key; and
performing the ad hoc communication with said source terminal in encryption by using the extracted encryption key.

19. The ad hoc communication method according to claim 9, wherein at said destination terminal, further comprising the steps of:
judging whether user information of said source terminal is included in said management information or not, in the case where the received call was judged for its own terminal; and
distinguishing said source terminal based on said user information when said user information of said source terminal was included.

20. The ad hoc communication method according to claim 9, wherein said user information of a radio terminal is telephone number information.

* * * * *